United States Patent [19]
Harris

[11] Patent Number: 5,463,808
[45] Date of Patent: Nov. 7, 1995

[54] DISCRETE PALLET DECK BOARD REMOVER MACHINE

[76] Inventor: Milton Harris, Rte. 1, Box 589, Palmyra, Ind. 47164

[21] Appl. No.: 340,280

[22] Filed: Nov. 15, 1994

[51] Int. Cl.⁶ .................................................. B23P 19/00
[52] U.S. Cl. .................... 29/823; 29/239; 29/244; 29/253; 29/426.5
[58] Field of Search .................. 29/426.1, 426.2, 29/426.3, 426.4, 426.5, 823, 239, 244, 253; 198/728; 414/758, 759, 763, 766

[56] References Cited

U.S. PATENT DOCUMENTS

| | | | |
|---|---|---|---|
| 2,758,702 | 8/1956 | Smoker | 198/728 |
| 3,512,242 | 5/1970 | Harvis | 29/426.5 |
| 3,740,815 | 6/1973 | Campbell et al. | 29/239 |
| 3,758,365 | 9/1973 | Schilling | 414/763 |
| 3,846,890 | 11/1974 | Bielkiewicz | 29/239 |
| 3,899,816 | 8/1975 | Jennings | 29/239 |
| 3,916,498 | 11/1975 | Lopez et al. | 29/239 |
| 3,991,459 | 11/1976 | Rapp | 29/244 |
| 4,051,588 | 10/1977 | Conkle | 29/426.5 |
| 4,089,098 | 5/1978 | DeMarco | 29/239 |
| 4,392,403 | 7/1983 | Martindale, Jr. | |
| 4,586,235 | 5/1986 | Benvenuto | |
| 4,676,000 | 6/1987 | James | |
| 4,750,255 | 6/1988 | Hufnagel | |

Primary Examiner—David P. Bryant
Attorney, Agent, or Firm—Camoriano & Smith

[57] ABSTRACT

A discrete deck board remover apparatus comprises a pallet pusher assembly for pushing a pallet into a position in which a selected deck board can be removed by a deck board plow assembly. Once the defective deck board is removed, the pallet can be optionally removed from further operation or moved to a second position in which the pallet can be turned over and returned to the position with the opposite side up whereupon further defective deck boards can be removed by the deck board plow assembly.

11 Claims, 4 Drawing Sheets

DISCRETE PALLET DECK BOARD REMOVER MACHINE

BACKGROUND OF THE INVENTION

This invention relates to a machine for the removal of deck boards from a pallet and, more particularly, to a hydraulically operated machine for the selective removal of discrete pallet boards from a pallet.

Wood pallets are commonly used in industry for the transportation and storage of products. Wood pallets provide a base upon which products can be stored and easily moved by use of a forklift.

Wood pallets are formed of three stringers which may be 2×4's. The stringers are placed parallel to each other and deck boards are nailed to the top and bottom edges of the stringers. Deck boards are typically 1×4's or 1×6's. The deck boards are nailed to the stringers with small gaps between them to provide a generally flat, horizontal surface.

Although very durable, wood pallets are subject to damage because of the rugged condition in which pallets are handled. Deck boards and stringers can become damaged from excess weight or weak areas can form if the boards have knots or imperfections so as not to provide a good material receiving surface. The damaged condition of the wood pallet will require the removal of the damaged wooden members to allow for their replacement. In the past, the damaged pallets were discarded because it was more economical to build another pallet. In recent years, the cost of hardwood has increased dramatically and recycling efforts for these damaged wood pallets have increased accordingly.

Some of the solutions to the problem of repairing wood pallets are as follows:

- U.S. Pat. No. 4,676,000, "James", discloses a power driven tool for severing a nail which fastens together a board and a stringer of a pallet. U.S. Pat. No. 4,392,403, "Martindale, Jr.", discloses a portable apparatus that can selectively remove certain stringers or deck boards in a wooden pallet to permit on site repair. Both of these references require their device to be positioned at three different attachment positions of the damaged deck board. This significantly increases the time required for removing the damaged board.

- U.S. Pat. No. 4,750,255, "Hufnagel", discloses a machine for disassembling wood pallets. The apparatus utilizes two cutter wheels to cut the nails as they are rolled along the outside edge of the pallet. U.S. Pat. No. 4,586,235, "Benvenuto", discloses a pallet stripper apparatus adapted to automatically accommodate variations in pallet size while simultaneously stripping the pallet boards from the runners. These references do not allow for the selective removal of individual boards.

While these references provide a means for disassembling a wood pallet and cutting the nails, they do not disclose an apparatus that can selectively remove individual damaged deck boards in an efficient manner without need for cutting nails.

It is therefore a paramount object of the present invention to provide for an apparatus that selectively removes defective deck boards from a pallet without the need for removing the nails connecting the stringers to the defective deck boards.

It is another object of the present invention to provide for an apparatus that can selectively remove the defective deck boards that may be present on both sides of a pallet.

It is still a further object of the present invention to provide for an apparatus that can roll over a pallet from one side to another in order that defective deck boards can be removed from either side.

It is still another object of the present invention to provide for a high speed and continuous production oriented apparatus that can efficiently and effectively remove defective deck boards without the need for cutting or severing nails connecting the boards to the pallet stringer.

It is an even further important object to provide for a labor saving apparatus for removing defective deck boards from a pallet.

These and other objects of the present invention will become realized from a reading of the foregoing and the appended claims.

SUMMARY OF THE INVENTION

The present invention pertains to an apparatus for the removal of defective deck boards from the stringers of a pallet and includes a frame structure defining a substantially horizontal bed for supporting a pallet, a pallet pusher assembly for moving the pallet in a predetermined direction along the support bed, and a plow assembly, including at least two spaced plow blades, movable between raised and lowered positions. The plow blades are adapted to abut a stringer of the pallet and engage a defective deck board located on the top side of the pallet when the assembly is in the lowered position and the pallet is being moved in the predetermined direction. The plow assembly further includes a plow support member movably mounted to the frame structure and supporting the plow blades. A power mechanism is operatively connected to the plow support member for selectively moving the plow support shaft between the lowered and raised positions.

The apparatus may further include a pallet roll over assembly for securing a pallet when the pallet has been moved to a predetermined position off the bed and rolling the pallet over to a new position above the bed in which the pallet may be released to assume a reversed position on the bed thus permitting the apparatus to operate again on the pallet to remove additional defective boards on the other side of the pallet.

DETAILED DESCRIPTION OF THE PREFERRED EMBODIMENT

Figure 1:
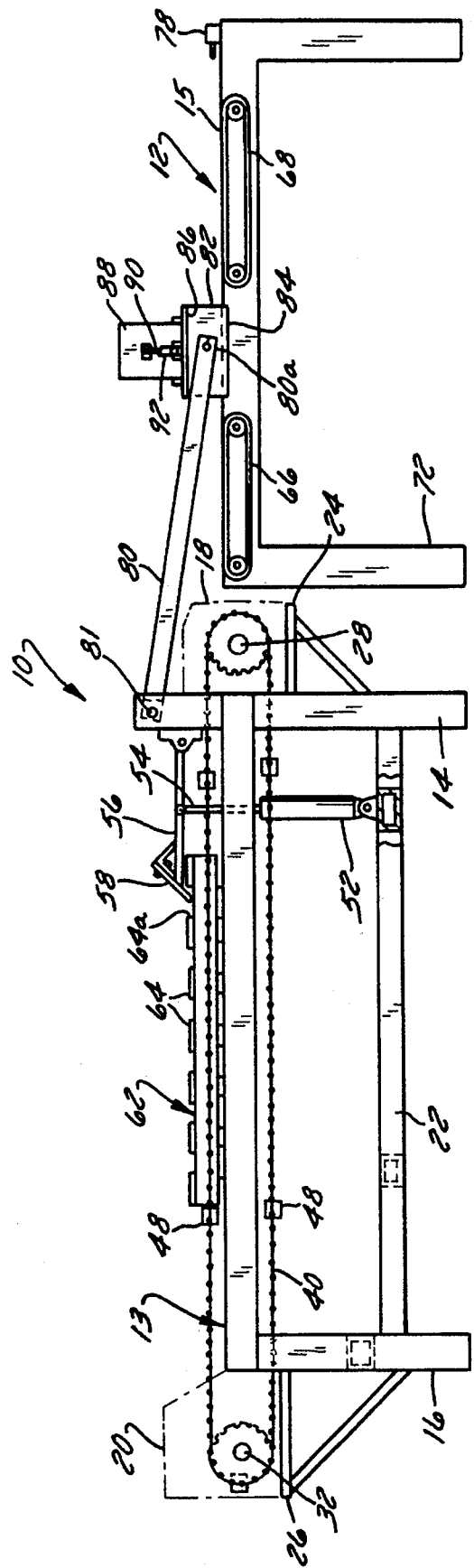
FIG. 1 is a side sectional schematic of a discrete board remover apparatus in accordance with the present invention.

Referring variously to FIGS. 1 through 7, it may be seen that an apparatus constructed in accordance to my invention is comprised of two interrelated sections, pallet deck board removal section 10 and pallet roll over section 12. Section 10 is generally defined by a flat, substantially horizontal bed 13 supported at a front end by legs 14 and at the tail or rear end by legs 16. A housing 18 (shown in dashed lines in FIG. 1) is secured to the front end of bed 13 while a second housing 20 (also shown in dashed lines) is secured to the rear end of bed 13. A pair of braces 22 is mounted between legs 14 and 16 beneath and on either side of bed 13. Cross braces 22a shown in section by dashed lines in FIG. 1 extend between braces 22.

Figure 2:
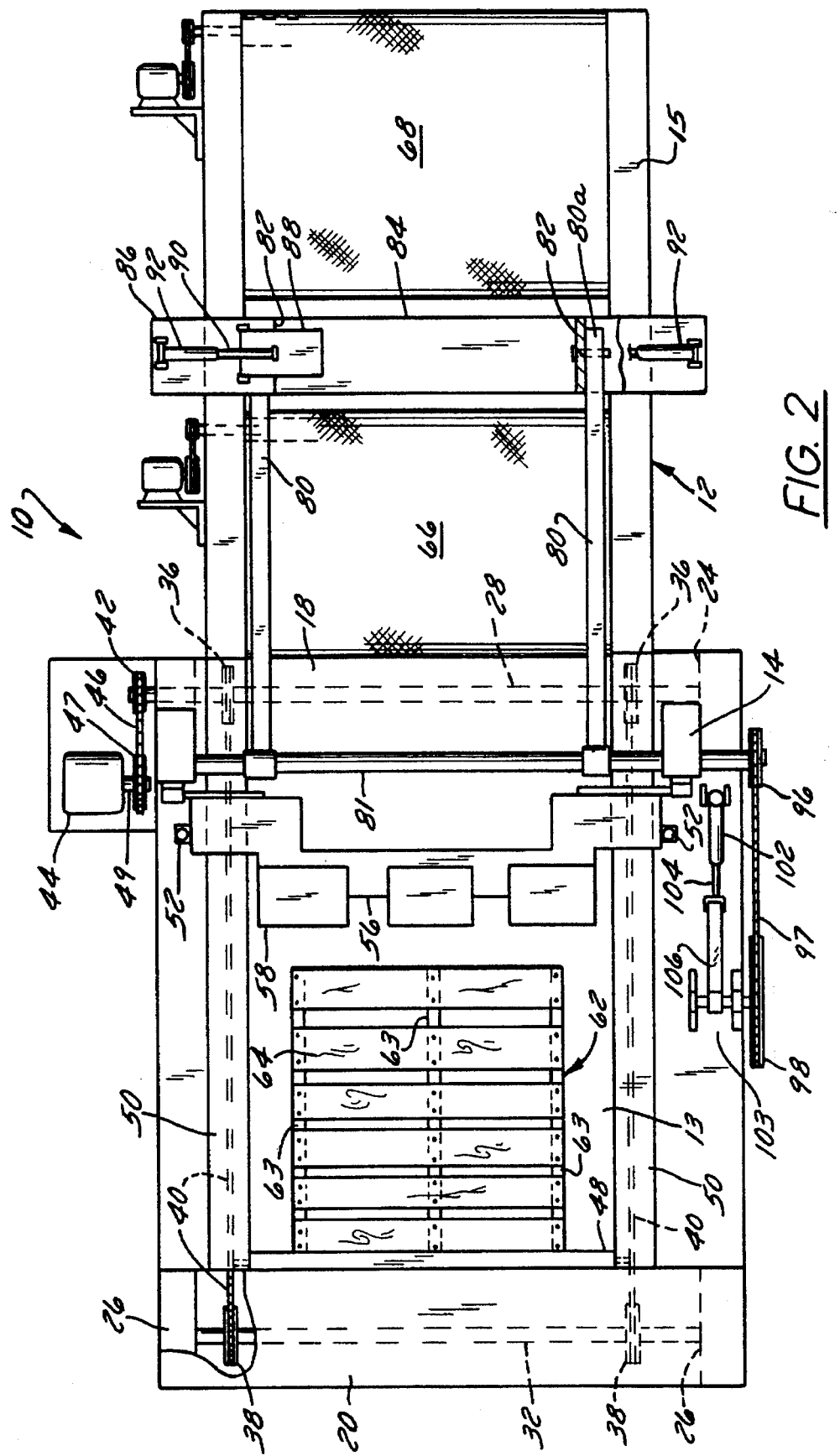
FIG. 2 is a top view of the apparatus shown in FIG. 1 with portions broken away to show certain of the pallet moving and clamping components.

For clarity in the top view of FIG. 2, a portion of housing 20 is broken away to better illustrate the components of the pallet moving assembly. The assembly comprises a pair of shafts 28 and 32 rotatably journaled in respective bearing supports 24 and 26 extending from legs 14 and 16 at about the level of bed 13. As best seen FIGS. 1 and 2, legs 14 extend above the level of bed 13 for a purpose to be described below. Front drive shaft 28 is keyed to sprockets 36 while tail shaft 32 is keyed to sprockets 38. Sprockets 36 and 38 are aligned so as to mount drive chains 40 above and approximately seven to eight inches from the edge of bed 13. Drive shaft 28 additionally is keyed to a drive sprocket 42 which is operatively connected to a hydraulic motor 44 by chain 46 and sprocket 47 mounted on motor drive shaft 49.

The top plan view of FIG. 2 shows a pusher bar 48 mounted between and carried by chains 40 across bed 13 and abutting a pallet 62. As will be discussed in the operative sequence of the apparatus below, pusher bar 48 serves to propel pallet 62 along bed 13. It is desirable that a plurality of pusher bars be used, preferably about four equally spaced apart as illustrated in FIG. 1 where pusher bar 48 is shown abutting pallet 62 just above the surface of bed 13. A pair of chain guards 50, the tops of which extend above bed 13, covers the ends of bars 48 and the entire length of chains 48 between housings 18 and 20. Housings 18 and 20 also serve to shield the sprockets and shafts with respective chain interaction from accidental contact by the operator.

Figure 3:
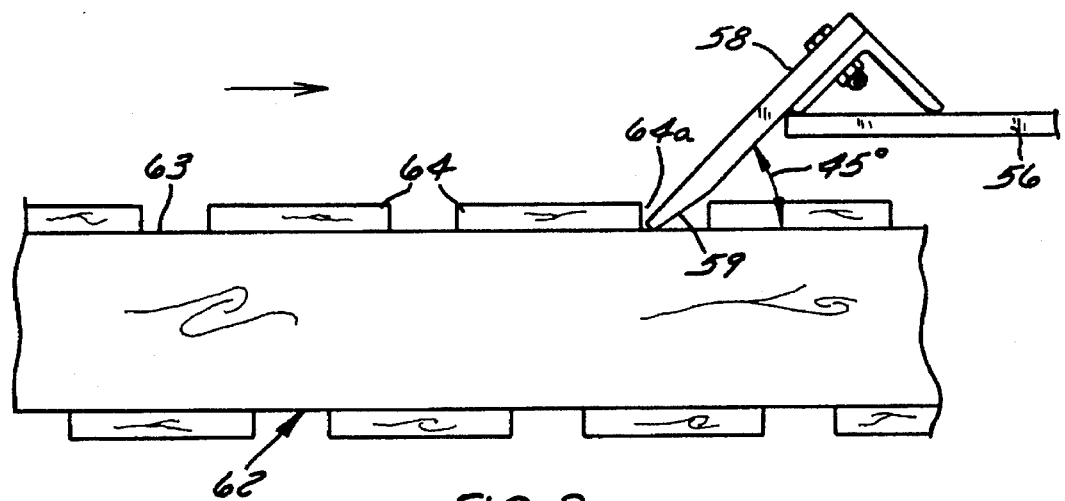
FIG. 3 is an enlarged side view of the plow blade component assembly with the plow blades in the down position; position.

As best seen in FIG. 1, a pair of hydraulic cylinders 52 are pivotally attached to braces 22a each with a piston actuating shaft 54 extending upwards and pivotally connected to plow blade support 56. A portion of brace 22 in FIG. 1 is broken away to show the connection of cylinder 52 thereto. One end of plow blade support 56 is pivotally connected to the upper portion of front legs 14 above bed 13. The other end of each blade support mounts a plurality of plow blades 58, angled to the horizontal. As best seen in FIG. 3, plow blades 58 are about an angle of 45° relatively to bed 13 and have a width permitting the tip of each plow blade 58 to reach to the surface of stringer 63 between adjacent deck boards 64 of pallet 62 to the point of abutment of the selected deck board 64a with bed 13. The plow blade may be slightly beveled in region 59 as shown to facilitate this contact. The entire plow assembly is adapted to move between an elevated position in which the plow blades 58 are sufficiently far above pallet 62 to permit unimpeded movement thereof and a lowered position in which plow blades 58 are able to be in position to contact a selected deck board 64a as illustrated in FIGS. 1 and 3.

Pallets typically have widths of that vary among widths of 36, 40 and 48 inches. Thus, it is desirable that the plow blades 58 have a width sufficient to abut stringers of various widths of pallets no matter what the position of pallet 62 on bed 13 may be. The close proximity of blades 58 to the inner edge of chains guards 50 also ensures that blades 58 will be properly positioned.

After an operation of the discrete deck board removal apparatus on the top side of the pallet 62 to permit removal of defective deck boards, it may be desirable to also remove defective deck boards from the bottom side should a visual inspection initially detect defective boards defining the bottom side of the pallet. Section 12 has a bed 15 that is a continuous horizontal extension of bed 13 and provides the starting position of a "roll over sequence", resulting in a complete reversal of pallet 62 while it is being carried back to bed 13 should a visual inspection confirm the presence of a defective deck board on the bottom side. Bed 15 is defined by a pair of spaced belt conveyors 66 and 68 supported by a frame structure 72 which may be a separate structure as illustrated in FIGS. 1 and 2 or integral with the frame of section 10. The close proximity of belt conveyor 66 to bed 13 readily permits unimpeded movement of pallet 62 from bed 13 to conveyor 66. Thereafter, conveyor 66 having sufficient frictional contact with the front edge of pallet 62 continues movement of the pallet to conveyor 68 and then ultimately against stop switch 78 where, upon contact therewith, further movement of pallet 62 ceases. Conveyors 66 and 68 may be conveniently run off of the same power transmission source as pusher bar assembly or can be separately driven by a motor 103 as illustrated in FIG. 2.

Figure 4:
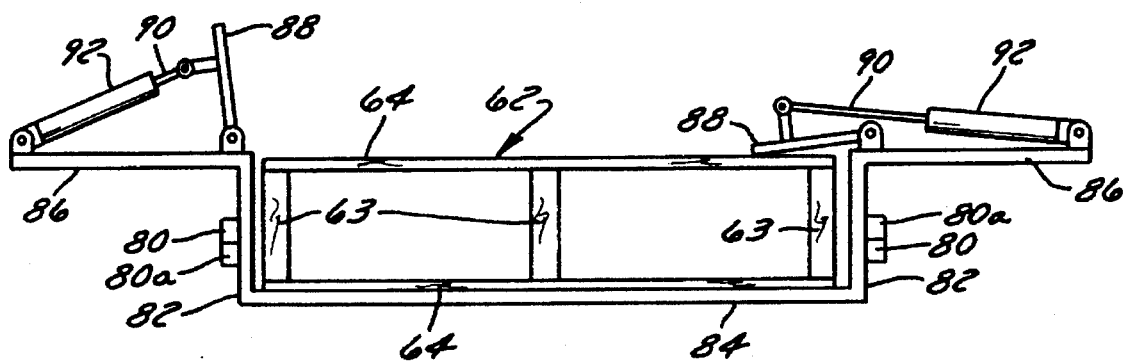
FIG. 4 is a front view of a pallet positioned in the roll over assembly showing details of the clamping assembly.

A pair of pallet roll over arms 80 are keyed to a shaft 81 pivotally mounted to the top extensions of legs 14 and, as best seen in FIG. 2, arms 80 extend over the edges of conveyor section 66 when nonoperative with the distal ends 80a thereof being positioned above the spacing between conveyors 66 and 68. FIG. 4 illustrates that the distal ends 80a of arms 80 are secured to a pallet clamp assembly 81. Pallet assembly 81 comprises side walls 82 integral with and extending vertically upward from a deck support platform 84, horizontally positioned between and substantially coextensive to the top of conveyors 66 and 68. A support flange 86 extends horizontally out from each of the side walls 82 and pivotally supporting a clamping mechanism 88. Each clamping mechanism 88 is pivotally connected to a cylinder rod 90 of a hydraulically actuated cylinder 92 pivotally mounted to flange 86. The clamping mechanism 88 is illustrated as being in the operative position and clamping a pallet 62 against platform 84. Cylinder 92 may be spring biased, for example, to maintain clamping arms 86 in a "non-clamping" position except when cylinder 92 is charged as shown on the left side of FIG. 4.

Figure 5:
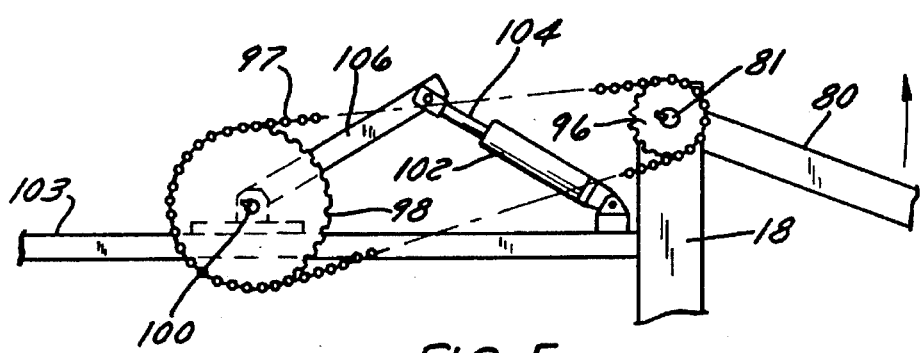
FIG. 5 is a side view schematically showing details of the roll over assembly components.
Figure 6:
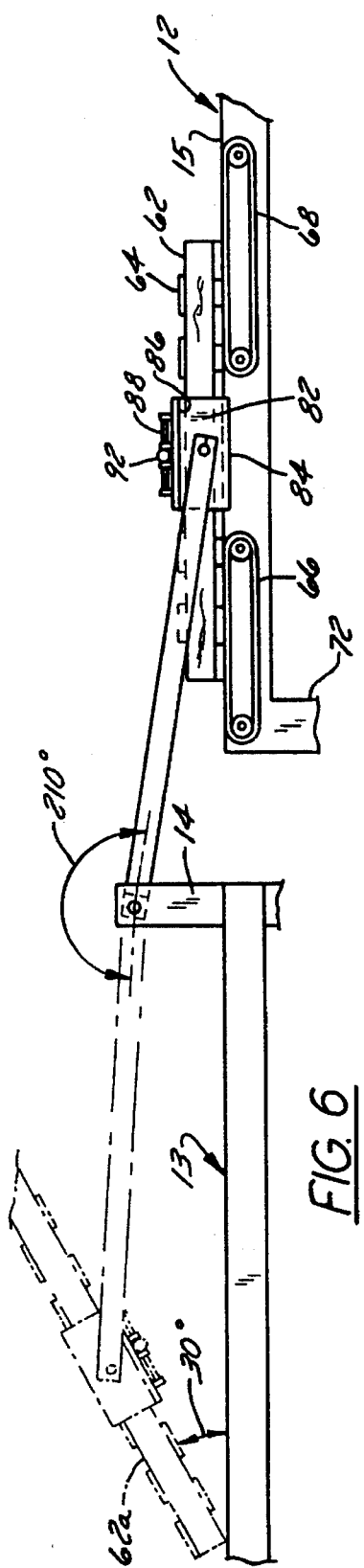
FIG. 6 is a schematic showing a pallet being in position prior to roll over and in the rolled over position before the pallet clamping components are released.

FIG. 2 and FIG. 5, depicting schematically the drive components of the roll over assembly, show a sprocket 96 keyed to shaft 81. A chain 97 connects sprocket 96 to a sprocket 98 of much larger diameter in turn keyed to shaft 100 rotatably mounted in a bearing support fixed to the side of the apparatus. A cylinder 102 is also pivotally mounted to bed 13 and has a cylinder rod 104 pivotally connected to crank shaft 106 keyed to shaft 100. Thus, movement of cylinder rod 104 when cylinder 102 is charged causes a large movement in sprocket 96 and therefore arms 80. Arms 80 will move pallet clamping assembly 81 and thus any pallet 62a clamped by mechanism 88 against platform 84. Then pallet 62a is moved from its position abutting conveyor sections 66 and 68 in an arc of about 210° to a position just above bed 13 as shown in the schematic of FIG. 6. In this position, pallet 62a is held at an angle of about 30° to bed 13. When clamping arms 88 are released, pallet 62a will fall into place on bed 13 in a position reversed from its original position. A deck board removing operation then can be performed on the original bottom side of pallet 62. Thereafter, pallet 62 is completely removed from the apparatus. Arms 80 extend normally over sections 66 and 68 as shown in FIGS. 1 and 2 when not in use.

Figure 7:
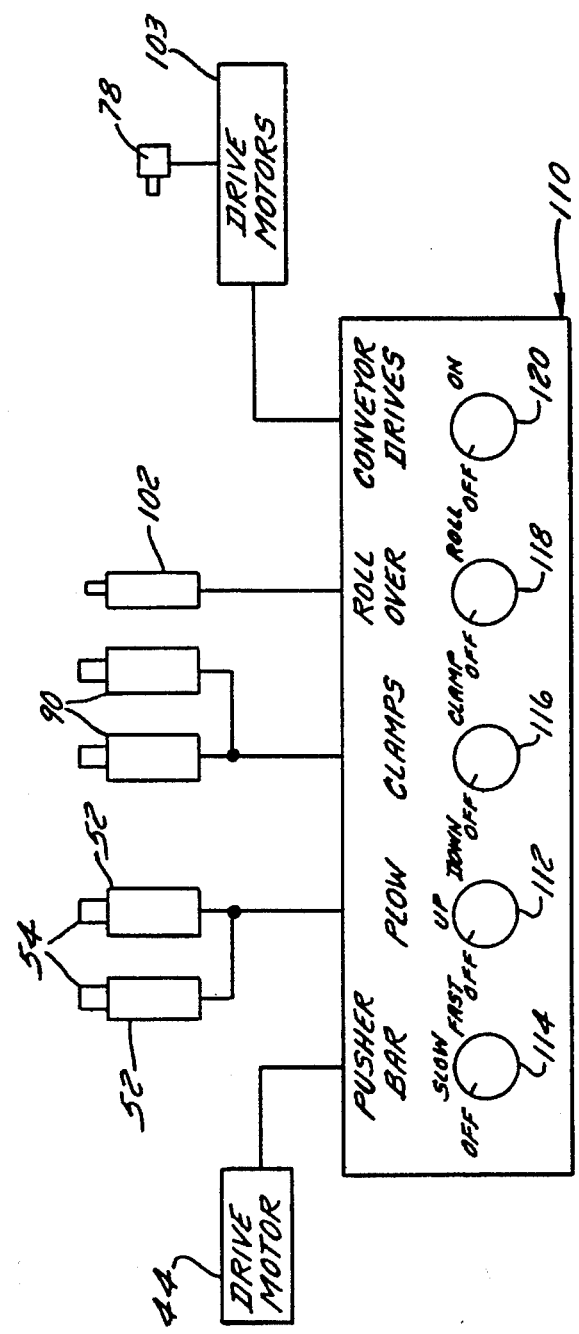
FIG. 7 is a schematic illustrating the control panel that may be employed with the present invention to control operation thereof.

The control mechanism for the entire apparatus may be best discussed with respect to the control panel 110 of FIG. 7 which includes a plow control valve switch 112, push bar assembly control valve switch 114, pallet clamp assembly valve switch 116, and a pallet roll over assembly valve switch 118. In operation, a pallet 62 is placed on bed 13 and visually inspected for defective deck boards. Assuming a defective deck board is noted on both top and bottom sides of pallet 62, an operator moves switch 114 to the fast position in which pallet 62 is moved by pusher bars 48 to a position in which the deck board space immediately before the top defective deck board is approximately beneath plow blades 58. Switch 114 is turned off and movement of pallet 62 ceases. Switch 112 is turned to the down position, charging cylinders 52 and causing plow blades 58 to be lowered into the space and contact with the stringers 63 of pallet 62.

The operator next moves switch 114 to the slow position. Pallet 62 is then caused to be moved slowly toward blades 58 and the defective board 64a is removed from the stringer. The operator stops forward movement of the pusher bars 48 and raises the plow blades, and the defective board is discarded. The operator then turns switch 120 to the on position, energizing motors 103 and therefore conveyors 66 and 68. Switch 114 is turned to the high speed position and pallet 62 is moved at a fast speed onto moving conveyor section 66 and continues its left-to-right movement over section 68 until contact switch 78 is hit by the forward edge of pallet 62. Motor 103 is switched off and pallet 62 ceases movement with its midpoint resting over platform 84. Clamping arms switch 116 is turned to the clamp position charging cylinder 90 causing clamping arms 86 to clamp pallet 62 against platform 84. Then pallet roll over assembly switch 118 is turned to the roll position, causing cylinder 102 to be charged and resulting in movement of roll over arms 80 to a position shown in dashed lines in FIG. 6. Pallet 62 is turned in an arc of about 210° and is held stationary at angle of about 30° with respect to horizontal bed 13. Cylinder 90 is discharged by turning switch 116 to its off position and pallet 62 is released and falls into registry on bed 13 between chain guards 50. Cylinder 102 then may be discharged to allow roll over arms 80 to return to the normal and biased position. The operator then can initiate operation as described above, remove the defective board and move pallet 62 against stop switch 78. The operator then can remove pallet 62 while another pallet is being placed on bed 13 for inspection.

It should be understood that the control mechanism explained for operating the various components was used only for example purposes. The control mechanism could be electrical, hydraulic pneumatic or a combination of the various types as desired. Thus, while the switches used in the operative sequence explained above connote an electrical operation of hydraulic components, the switches could have been valves connected to a hydraulic system as well. Other modifications and changes will become evident to one with ordinary skill in the art following a reading of the description herein taken with the drawings. Therefore, it should be further understood that in light of a reading of the foregoing description and drawings that those with ordinary skill in the art will be able to make such changes and modifications to the present invention without departing from the spirit or scope of the invention as defined in the following appended claims.

I claimed:

1. An apparatus for the removal of a preselected defective deck board from the stringers of a pallet comprising
   (a) a frame structure defining a substantially horizontal bed for supporting a pallet;
   (b) a plow assembly positioned above said bed and including
      (i) a plow support member for mounting a plurality of spaced plow blades, said plow support member movably mounted to said frame structure, and
      (iii) a power mechanism operatively connected to said plow support member for selectively moving said plow support member and said plow blades between lowered and raised positions;
   (c) a pallet pusher assembly for moving said pallet in a predetermined direction along said support bed toward said plow assembly from a point where said pallet is placed on said bed to a defective board removal position below said plow support member and said plow blades in said raised position,
   said spaced plow blades being held stationary and abutting respective stringers of said pallet between said preselected defective board and an adjacent board when in said lowered position and when said pallet is positioned at said defective board removal position, said pallet pusher urging said defective pallet board against said spaced plow blades being held stationary when in said lowered position whereby said preselected defective board is caused to be lifted away from said respective stringers.

2. The apparatus of claim 1 in which said pallet pusher assembly includes a drive chain and a plurality of spaced pusher bars operatively connected to said drive chain and adapted to push said pallet in said predetermined direction.

3. The apparatus of claim 2 in which said pallet pusher assembly includes a pair of drive chains spaced apart by said bed and said spaced pusher bars extending across said bed between said chains.

4. The apparatus of claim 3 including a plurality of pusher bars spaced substantially equidistant apart along said drive chains.

5. The apparatus of claim 3 in which said plow support member includes a shaft extending above and across said bed and pivotally mounted to said frame on opposite sides of said bed.

6. The apparatus of claim 5 in which said plow blades are positioned at an angle to a horizontal plane when said plow blades are in the lowered position.

7. The apparatus of claim 1 including a pallet roll over assembly for securing a pallet when said pallet has been moved to a predetermined position off said bed and rolling said pallet over to a new position above said bed in which said pallet may be released to assume a reversed position on said bed whereby defective deck boards of said pallet on the other side thereof can be removed by said plow assembly.

8. The apparatus of claim 7 in which said pallet roll over assembly includes
   a pallet clamping mechanism that clamps said pallet when said pallet is in said predetermined position,
   a pair of pallet roll over arms connected at one end to said pallet clamping mechanism and movably connected at the other end to said frame structure, and
   a moving mechanism operatively connected to said pallet roll over arms for moving said arms when said pallet clamping mechanism clamps said pallet in said predetermined position to a second position in which said pallet is in said new position.

9. The apparatus of claim 8 in which said pallet is moved to said predetermined position by a conveyor mechanism mounted separately from said frame.

10. The apparatus of claim 8 in which said pallet clamping mechanism comprises a platform positioned beneath the midpoint of a pallet when said pallet is in said predetermined position, a pair of clamping arms connected to and spaced from one another on either side of said platform and movable between clamped and unclamped positions, said clamping arms in said clamping position clamping said pallet against said platform.

11. The apparatus of claim 10 in which said roll over arms move said pallet through an arc greater than about 180° from said predetermined position to said new position.

* * * * *